United States Patent
Qiao et al.

(10) Patent No.: US 10,345,970 B2
(45) Date of Patent: Jul. 9, 2019

(54) PIECEWISE ESTIMATION FOR DISPLAY NOISE COMPENSATION

(71) Applicant: Microsoft Technology Licensing, LLC, Redmond, WA (US)

(72) Inventors: Tianzhu Qiao, Portland, OR (US); Jonathan Westhues, Portland, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 249 days.

(21) Appl. No.: 15/040,797

(22) Filed: Feb. 10, 2016

(65) Prior Publication Data

US 2017/0228061 A1    Aug. 10, 2017

(51) Int. Cl.
    *G06F 3/044*     (2006.01)
    *G06F 3/041*     (2006.01)

(52) U.S. Cl.
    CPC ............ *G06F 3/044* (2013.01); *G06F 3/0412* (2013.01)

(58) Field of Classification Search
    CPC ....... G06F 3/044; G06F 3/0412; G06F 3/0416
    See application file for complete search history.

(56) References Cited

U.S. PATENT DOCUMENTS

| | | | |
|---|---|---|---|
| 7,643,011 B2 | 1/2010 | O'Connor et al. | |
| 7,649,524 B2 | 1/2010 | Haim et al. | |
| 8,754,862 B2 | 6/2014 | Zaliva | |
| 9,164,137 B2 | 10/2015 | Page et al. | |
| 2002/0135568 A1 | 9/2002 | Chen | |
| 2010/0044122 A1 | 2/2010 | Sleeman et al. | |
| 2010/0139991 A1 | 6/2010 | Philipp et al. | |
| 2011/0115729 A1 | 5/2011 | Kremin et al. | |
| 2011/0216016 A1 | 9/2011 | Rosener | |
| 2011/0260998 A1 | 10/2011 | Ludwig | |
| 2012/0062474 A1 | 3/2012 | Weishaupt et al. | |
| 2012/0223911 A1 | 9/2012 | Westhues | |

(Continued)

OTHER PUBLICATIONS

ISA European Patent Office, International Search Report and Written Opinion Issued in PCT Application No. PCT/US2017/016312, dated Apr. 13, 2017, WIPO, 14 Pages.

(Continued)

*Primary Examiner* — Gerald Johnson
(74) *Attorney, Agent, or Firm* — Alleman Hall Creasman & Tuttle LLP (57) ABSTRACT

A touch-sensitive display device includes a touch sensor, drive circuitry and receive circuitry. The touch sensor has a matrix of row electrodes and column electrodes. The drive circuitry drives the row electrodes during a touch-sensing frame to influence electrical conditions on the column electrodes. The receive circuitry, during the touch-sensing frame, for each row electrode of the matrix, measures a capacitance of each column electrode while the row electrode is being driven, for each of a plurality of different sections of column electrodes of the matrix, performs local analysis of the measured capacitances of the column electrodes of the section to estimate a row-specific noise capacitance for each column electrode, and determines a touch input based on a difference between the measured capacitance of the column electrode while the row electrode is being driven and the estimated row-specific noise capacitance of the column electrode.

20 Claims, 5 Drawing Sheets

(56) References Cited

U.S. PATENT DOCUMENTS

| | | |
|---|---|---|
| 2013/0033451 A1 | 2/2013 | Olson |
| 2013/0106779 A1 | 5/2013 | Company Bosch et al. |
| 2013/0222290 A1* | 8/2013 | Choi ................. G06F 3/041 345/173 |
| 2013/0321326 A1* | 12/2013 | Kwon, II ............ G06F 3/044 345/174 |
| 2014/0022203 A1 | 1/2014 | Karpin et al. |
| 2015/0184991 A1 | 7/2015 | Nakabayashi et al. |
| 2015/0199045 A1 | 7/2015 | Robucci et al. |
| 2015/0253890 A1* | 9/2015 | Sobel ................ G06F 3/0416 345/173 |
| 2015/0309618 A1 | 10/2015 | Keppel, Jr. et al. |

OTHER PUBLICATIONS

Klein, Hans W., "Noise Immunity of Touchscreen Devices", In White Paper of Cypress, Feb. 2013, pp. 1-13.

\* cited by examiner

PIECEWISE ESTIMATION FOR DISPLAY NOISE COMPENSATION

BACKGROUND

Many touch sensors employ capacitance-based sensing, in which signals on a matrix of row electrodes and column electrodes are interpreted by receive circuitry to detect touch events occurring at different locations on the matrix. Signal noise from various sources may interfere with the ability of the receive circuitry to accurately detect touch input (e.g., cause false detection and/or non-detection of touch input). More particularly, signal noise having a similar frequency or other characteristics as an excitation signal of voltage drivers of the touch sensor may interfere with touch input detection.

DETAILED DESCRIPTION

Signal noise from various sources may interfere with the ability of a capacitive touch sensor to accurately detect touch input. Such signal noise may be mitigated in various ways. In one example, signal noise is mitigated on a row-by-row basis for a touch sensor matrix by estimating signal noise from an average of a measured capacitance of column electrodes along an entire row.

However, such an approach may cause false detections of touch inputs in some cases. In particular, false detections of touch inputs may occur in specific portions of a row due to significant variances in signal noise in those portions relative to the average signal noise of the entire row. Such variances in signal noise may occur for different reasons.

In one example, in which a touch sensor is bonded to a display (e.g., an LCD display), an amplitude of noise current may be approximately proportional to a reciprocal of a bond-line thickness between the display and the touch sensor. Due to variances in manufacturing, the bond-line thickness may vary greatly across a row (e.g., more than twice as thick in some portions relative to other portions). For example, in portions of a row where the bond-line is thin, the amplitude of the noise current may be greater than the average measured current for the entire row. For these high-noise portions of the row, the estimated noise capacitance of the row does not accurately mitigate the signal noise. As such, false detections of touch inputs can occur in these portions of the row.

In another example, signal noise may vary along a row based on an image displayed by the display. In this case, the characteristics of the signal noise are time and/or space varying. As such, the signal noise may vary along different portions of a row, row-to-row, and frame-to-frame.

Accordingly, the present description contemplates a signal noise mitigation approach for a touch sensor that employs piecewise signal analysis over a plurality of different sections of a touch sensing matrix. The piecewise analysis may provide row-specific signal noise mitigation that is localized for each section of the touch sensing matrix. By providing signal noise mitigation that is localized for each section, the signal noise mitigation may be tailored to account for signal noise variances of each section. Accordingly, signal noise mitigation accuracy may be increased, and correspondingly touch input detection accuracy may be increased for a touch sensor.

Figure 1:
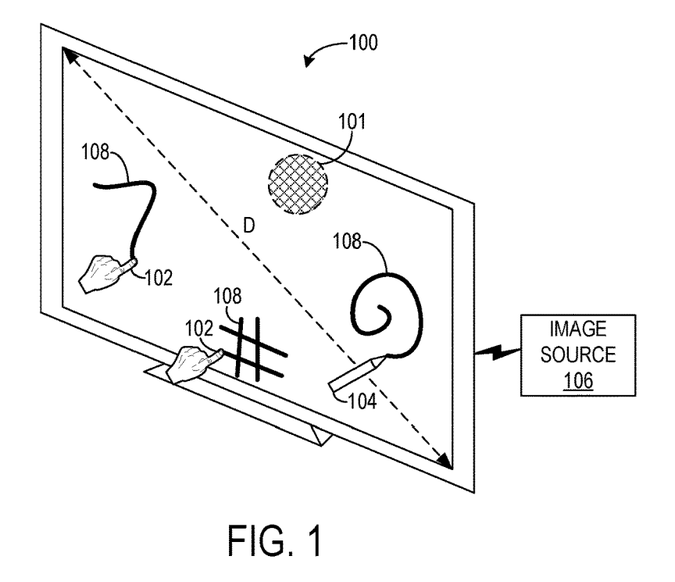
FIG. 1 shows an example touch-sensitive display device.

FIG. 1 shows a touch sensitive display device 100 including a touch sensor 101. In some examples, display device 100 may be a large-format display device with a diagonal dimension D greater than 1 meter, for example, though the display may assume any suitable size. Display device 100 may be configured to sense one or more sources of input, such as touch input imparted via a digit 102 of a user and/or input supplied by an input device 104, shown in FIG. 1 as a stylus. Digit 102 and input device 104 are provided as non-limiting examples and any other suitable source of input may be used in connection with display device 100. Further, display device 100 may be configured to receive input from input devices in contact with the display device 100 and input devices not in contact with the display device 100 (e.g., input devices that "hover" proximate to a surface of the display). "Touch input" as used herein refers to both types of input. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device are described below with reference to FIG. 7.

Figure 2:
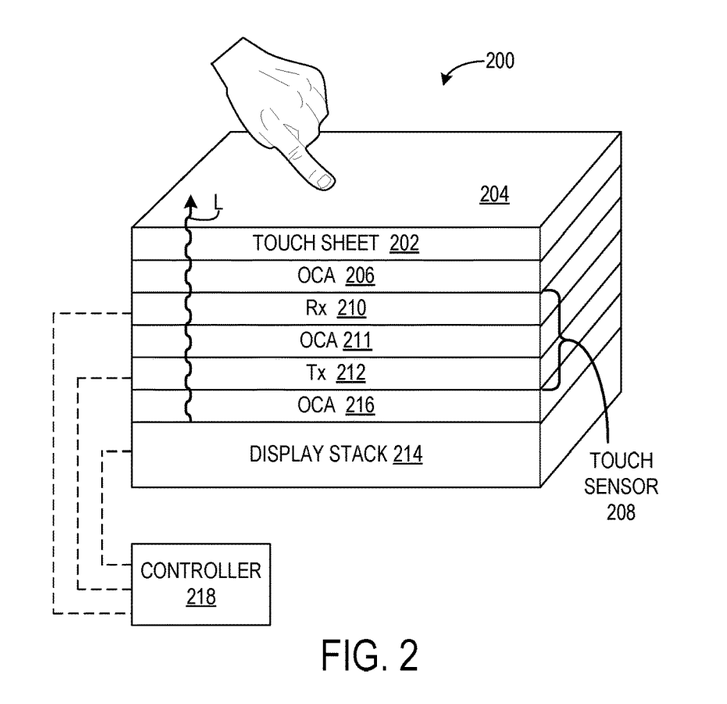
FIG. 2 shows an optical stack and associated subsystems of the touch-sensitive display device of FIG. 1.

FIG. 2 is a cross-sectional view of an optical stack 200 of display device 100 of FIG. 1. Optical stack 200 includes a plurality of components configured to enable the reception of touch input and the generation of graphical output. Optical stack 200 may include an optically-clear touch sheet 202 having a top surface 204 for receiving touch input, and an optically-clear adhesive (OCA) 206 bonding a bottom surface of the touch sheet 202 to a top surface of a touch sensor 208, which may correspond to touch sensor 101 of FIG. 1, for example. Touch sheet 202 may be comprised of any suitable material(s), such as glass, plastic, or another material. As used herein, "optically-clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. For example, receive and transmit electrode layers 210 and 212 each may be formed on a respective dielectric substrate comprising materials including but not limited to glass, polyethylene terephthalate (PET), or cyclic olefin polymer (COP) film. Receive and transmit electrode layers 210 and 212 may be bonded together by a second optically-clear adhesive (OCA) 211. OCA 211 may be an acrylic pressure-sensitive adhesive film, for example.

The touch sensor configuration illustrated in FIG. 2 is provided as an example, and other arrangements are within the scope of this disclosure. For example, in other implementations, layers 210, 211, and 212 may be integrally formed as a single layer with electrodes disposed on opposite surfaces of the integral layer. Further, touch sensor 208 may alternatively be configured such that transmit electrode layer 212 is provided above, and bonded, via OCA 211, to receive electrode layer 210 positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 is bonded, at a bottom surface of transmit electrode layer 212, to a display stack 214 via a third optically-clear adhesive (OCA) 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer 212, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers may be implemented for each of receive electrode layer 210, transmit electrode layer 212, and display stack 214. In some implementations, controller 218 may be implemented in image source 106 of FIG. 1. As used herein, "controller" means physical data-storage and processing circuit(s) and/or other hardware programmed with instructions to perform specialized computing operations. It is to be understood that two or more different circuits and/or other controllers may share hardware components. For example, the same integrated circuit may be part of two or more different controllers programmed to perform different functions.

Figure 3:
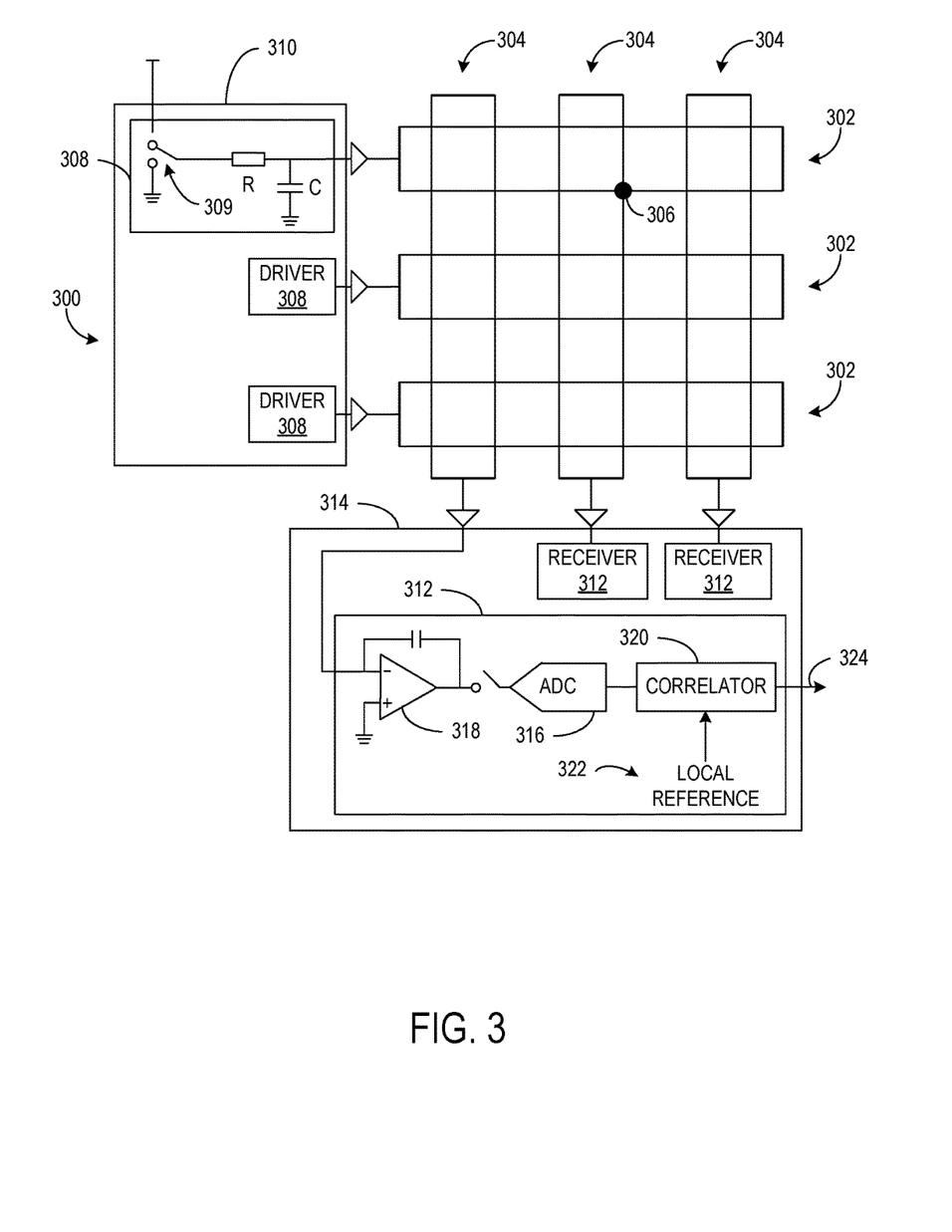
FIG. 3 shows an example touch sensor matrix of the touch-sensitive display device of FIG. 1.

FIG. 3 shows an example touch sensor matrix 300. Matrix 300 may be included in touch sensor 208 of optical stack 200 of FIG. 2 to bestow touch sensing functionality to display device 100 of FIG. 1, for example. Matrix 300 includes a plurality of electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. The transmit rows 302 and receive columns 304 may be positioned/oriented according to any suitable layout. For example, transmit rows 302 may be oriented horizontally with respect to ground, vertically with respect to ground, or at another angle. Likewise, receive columns 304 may be oriented horizontally with respect to ground, vertically with respect to ground, or at another angle.

Each transmit row 302 in matrix 300 may be attached to a respective driver 308 configured to drive its corresponding transmit row with a time-varying voltage. In some implementations, drivers 308 of matrix 300 may be driven by a microcoded state machine implemented within a field-programmable gate array (FPGA) forming part of controller 218 of FIG. 2, for example. Each driver 308 may be implemented as a shift register having one flip-flop (e.g., represented in simplified form as a switch 309) and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa. If the shift register is used in this fashion, excitation sequences may take on only two digital values—e.g., only binary excitation sequences can be transmitted.

In other implementations, drivers 308 may be configured to transmit non-binary excitation sequences that can assume three or more digital values. Non-binary excitation sequences may enable a reduction in the harmonic content of driver output and decrease the emissions radiated by matrix 300.

The drivers 308 may collectively be implemented as drive circuitry 310. Circuitry 310 may be configured to receive commands/inputs from one or more computer components, for example. Further, circuitry 310 may coordinate the activation of each driver 308. For example, circuitry 310 may establish an order in which each driver 308 is driven, as well as determine the signal each driver uses to drive its corresponding row.

In some implementations, matrix 300 may be configured to communicate with an active stylus. This implementation may at least partially enable touch sensitive display device 100 to communicate with input device 104 when matrix 300 is implemented in display device 100. Specifically, an electrostatic channel may be established between one or more transmit rows 302 and a conductive element (e.g., electrode tip) of active stylus 104, along which data may be transmitted. In one example, communication via the electrostatic channel is initiated by the transmission of a synchronization pattern from matrix 300 to active stylus 104. The synchronization pattern may enable matrix 300 and active stylus 104 to obtain a shared sense of time, and may be transmitted via multiple transmit rows 302 so that the active stylus can receive the pattern regardless of its position relative to the matrix. The shared sense of time may facilitate the correlation of a time at which active stylus 104 detects an excitation sequence or other signal transmitted on transmit rows 302 to a location in matrix 300, as the synchronization pattern may yield an indication of the order in which transmit rows 302 are driven. Such correlation may enable active stylus 104 to determine at least one coordinate (e.g., y-coordinate) relative to matrix 300, which may be transmitted back to the matrix (e.g., via the electrostatic channel) or to an associated display device via a different communication protocol (e.g., radio, Bluetooth). To determine a second coordinate (e.g., x-coordinate) of active stylus 104, all transmit rows 302 may be held at a constant voltage, and active stylus 104 may transmit a time-varying voltage to matrix 300, which may sequentially measure currents resulting from a voltage of active stylus 104 in each receive column 304 to ascertain the second coordinate.

Each receive column 304 in matrix 300 may be coupled to a respective receiver 312 configured to receive signals resulting from the transmission of excitation sequences on transmit rows 302. The receivers 312 may be collectively implemented as receive circuitry 314. Circuitry 314 may be configured to process and interpret electrical signals detected by the receivers, with the aim of identifying and localizing touch events performed on matrix 300. During touch detection, matrix 300 may hold all transmit rows 302 at a constant voltage except for one or more active transmit rows along which one or more excitation sequences are transmitted. During transmission of the excitation sequences, all receive columns 304 may be held at a constant voltage (e.g., ground). With the excitation sequences applied to the active transmit rows 302 and all receive columns 304 held at the constant voltage, a current may flow through each of the nodes formed by the vertical intersections of the active transmit rows with the receive columns.

In some implementations, when the drive circuitry 310 sends the excitation sequence on the active row, the receiver 312 on each column may use an analog-to digital converter (ADC) 316 to sample the received signal from the analog front end 318. The sampled signal is correlated via a correlator 320 with a local reference 322 to measure the capacitor under test 324. In some implementations, the reference sequence may take on limited values (e.g., 0, 1), such that multiplications performed as part of the correlation may be implemented with additions and subtractions, for example, to reduce implementation complexity and hardware cost, or to speed up correlation calculations. In other implementations, the reference sequence may take on a greater range of values, for example to suppress more out of band noise.

Each current may be proportional to the capacitance of its corresponding node. Hence, the capacitance of each node may be measured by measuring each current flowing from the active transmit rows 302. In this way, touch input may be detected by measuring node capacitance. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above described touch sensor matrix is provided as an example, and is meant to be non-limiting. Other touch sensor configurations may be employed without departing from the scope of the present disclosure.

As discussed above, signal noise may vary substantially between different portions of a touch-sensor matrix including row-to-row, and even between different portions of a single row. For example, signal noise may vary across the matrix due to manufacturing tolerances of the matrix, imagery presented by a display bonded to the touch-sensor matrix, and other noise sources. Due to such variances in signal noise between different portions of a touch-sensor matrix, an approach for estimating signal noise from an average of a measured capacitance of column electrodes along an entire row may be inaccurate for some portions of the row. Such inaccuracy may result in false touch input detections and/or signal noise mitigation that also mitigates some touch input signals. Accordingly, to potentially increase the accuracy of estimating signal noise, the present description contemplates a novel method for compensating for signal noise by performing piecewise signal analysis of a plurality of different sections of the matrix 300. In particular, the matrix 300 is divided into a plurality of different sections of column electrodes 304. The signal analysis for a section can be considered localized, because the signal analysis is conducted on signals received from electrodes in the section. Further, the analysis provides a row-specific estimation of signal noise for each column electrode in the section.

Figure 4:
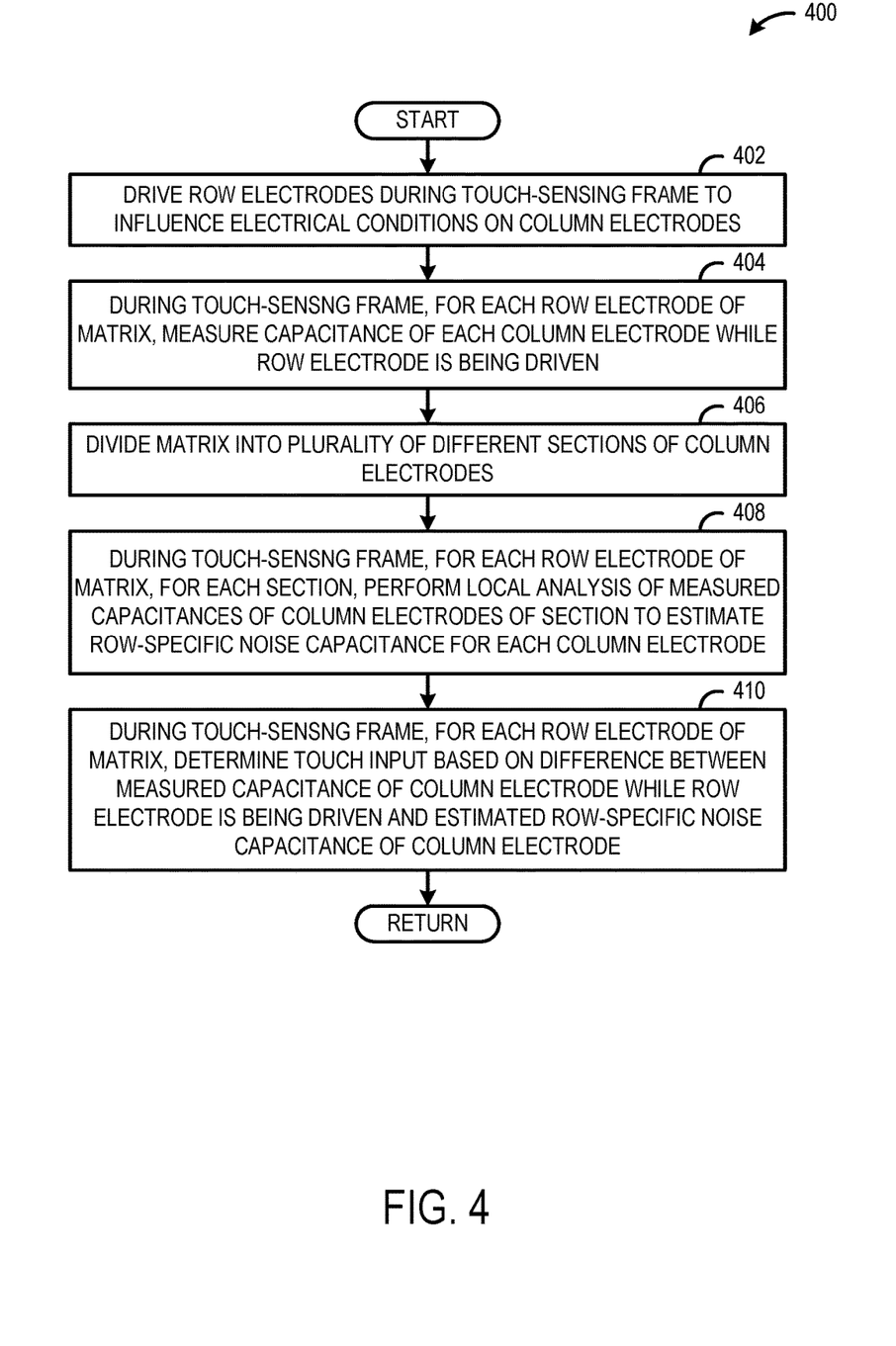
FIG. 4 shows an example method for controlling a touch-sensitive display device to accurately sense touch input by compensating for noise using piecewise analysis.

FIG. 4 shows an example method 400 for controlling a touch-sensitive display device to mitigate signal noise by utilizing piecewise analysis to provide localized estimations of signal noise. In one example, touch sensor 208 performs the method 400 in connection with associated control circuitry (e.g., controller 218).

At 402, the method 400 includes driving the row electrodes of the matrix during a touch-sensing frame to influence electrical conditions on the column electrodes. For example, the row electrodes may be driven according to an excitation sequence. In one example, the excitation sequence dictates that for each touch-sensing frame, each row is individually, sequentially driven until all rows of the matrix have been driven during the touch-sensing frame. The excitation sequence may be repeated for each touch-sensing frame. Line-by-line scanning may be employed for the rows, or various other scan patterns. In one example, drive circuitry 310 drives the row electrodes 302 of matrix 300.

At 404, the method 400 includes, during the touch-sensing frame, for each row electrode of the matrix, measuring a capacitance of each column electrode while the row electrode is being driven. In one example, the capacitance is measured by receive circuitry 314 of matrix 300. As described above, capacitance may be measured via measurement of current, voltage, or other conditions on the relevant electrode.

At 406, the method 400 includes dividing the matrix into a plurality of different sections of column electrodes. The matrix may be divided into any suitable number of sections, and each section may include any suitable number of column electrodes.

In some implementations, each section includes the same number of column electrodes. In some implementations, the number of column electrodes varies between different sections. The specific number of sections may be determined, in some examples, to balance trade-offs between canceling signal noise to increase touch input detection accuracy while not cancelling out actual touch input signals. In particular, if the matrix is divided into too few sections or if a section is made too big, then estimations of signal noise may become inaccurate due to significant signal noise variances in the section. On the other hand, if the matrix is divided into too many sections or if a section is made too small, then estimations of signal noise may not only fit the noise, but also touch input signals. In particular, after subtracting the noise estimation, the remaining signal may be close to zero everywhere, which makes a touch input signal less likely to be detected.

In some implementations, a number of sections in which the matrix is divided is based on one or more characteristics of the column electrodes of the matrix. In one example, the number of sections is determined based on a number of column electrodes of the matrix. In another example, the number of sections is determined based on a total width of the plurality of column electrodes of the matrix. In another example, the number of sections is determined based on a pitch between each column electrode. In one example, the touch sensor has a pitch size of 6.5 mm, and a single finger touch covers ~3 columns of the touch sensor. In this case, the size of each section is substantially greater than 3 columns, so that the noise estimation will not over-fit the touch signal. For example, the touch sensor may have a section including ~50 columns. In implementations having smaller pitch size, a lower limit of a number of columns in each section may be greater, so as to not over-fit the touch input signal. The number of sections may be determined based on any suitable characteristics of the column electrodes.

In some implementations, the column electrodes of the matrix may be divided into a plurality of sections once (e.g., at the time of device manufacture), and those same sections may be utilized each time piecewise signal analysis is performed. In other words, the number of sections may be fixed. Such an implementation may be suitable for operating conditions in which the signal noise is substantially static on a row-by-row basis. In one example, a touch sensor matrix of an 84 inch display device is divided into 6 sections. In another example, a touch sensor matrix of a 55 inch display device is divided into 4 sections. These examples are meant to be non-limiting, and any size display may be divided into any suitable number of sections.

In some implementations, the column electrodes of the matrix may be divided into a number of sections that varies. For example, the number of sections or the section size may vary based on time-varying noise characteristics of the touch-sensitive display device. Such time-varying noise characteristics may include signal noise resulting from a displayed image, signal noise produced by electronic components that changes over time as the electronic components mature, signal noise resulting from changes in temperature, and other noise characteristics.

In another example, the number of sections or the section size is varied based on an average magnitude of signal noise. For example, if the noise magnitude is large, then the section size may be decreased (number of sections increased) to reduce a likelihood of occurrences of false detections of touch input that could flood the device. Such a decrease in section size may be at the expense of reducing touch input sensitivity. In particular, the decrease in section size increases the degree of freedom to estimate the noise, which may increase a likelihood of over-fitting the noise estimation to the touch input signals and require a greater magnitude touch input signal to register as a touch input event. On the other hand, if the magnitude is small, then the section size may be increased (number of sections decreased) to reduce a likelihood of over-fitting the noise estimation to the touch input signals that would cause actual touch inputs to not be recognized. In one example, the number of sections may be varied between 0, 6, and 10 based on the average magnitude of signal noise falling between different capacitance thresholds. In particular, if the magnitude m<=5, then the section size L=0 (entire row averaging), if m>5 and <40, then L=6, and if m>=40 then L=10. In some implementations, the signal noise magnitude determination and/or the section size/number adjustment may be performed on a row-by-row basis.

In some implementations, the column electrodes of the matrix may be divided into a plurality of sections at least once for every threshold number of touch-sensing frames. In one example, the matrix is re-divided into sections at least every 100 touch-sensing frames. In some cases, the number of sections may change when the matrix is re-divided. In some cases, the number of sections may stay the same when the matrix is re-divided.

In some implementations, the column electrodes of the matrix may be divided into a plurality of sections at least once per touch-sensing frame. In some implementations, the column electrodes of the matrix may be divided into a plurality of sections more than once per touch-sensing frame. For example, the sections may be adjusted every other row, every fifth row, or another arbitrary number of rows. In some implementations, the column electrodes of the matrix may be divided into a plurality of sections or on a row-by-row basis during the touch-sensing frame. In other words, each time a different row is driven, the column electrodes of the matrix may be re-divided into a different section. Such an implementation may be particularly applicable to configurations where the refresh rate of the display is similar to the rate of the excitation sequence of the touch sensor. In other words, the imagery presented by the display may change quickly enough to produce signal noise that varies on a row by row basis.

At 408, the method 400 includes during the touch-sensing frame, for each row electrode of the matrix, for each section of column electrodes of the matrix, performing local analysis of the measured capacitances of the column electrodes of the section to estimate a row-specific noise capacitance for each column electrode in that section. The noise capacitance for a column electrode may be considered "row specific," because the noise capacitance for the column electrode is estimated each time a different row is driven. In other words, a noise capacitance is estimated for each node of the matrix. Any suitable type of analysis may be performed to estimate the row-specific noise capacitance for a column electrode.

Figure 5:
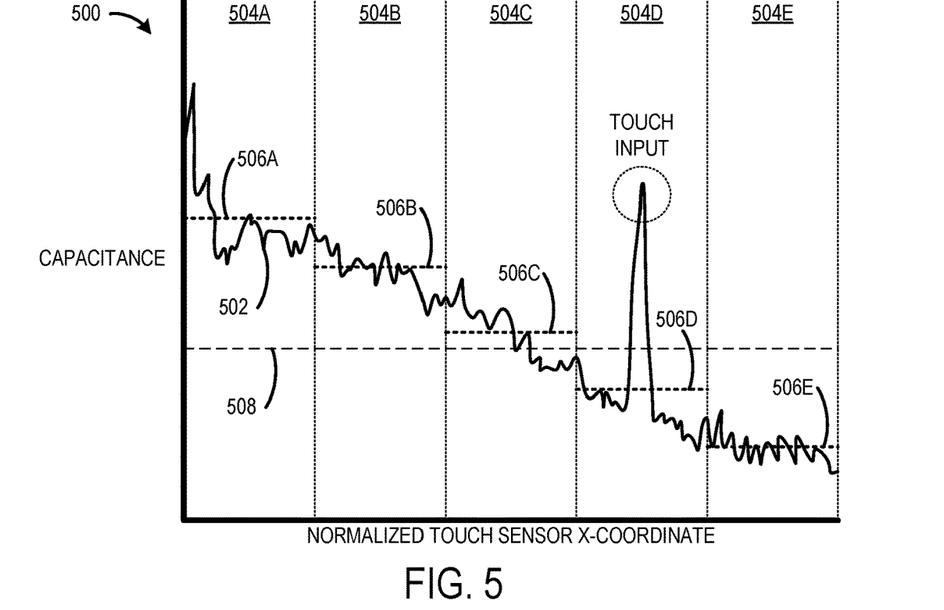
FIG. 5 shows an example visual representation of estimating noise capacitances localized to particular sections of a touch sensor matrix by taking an average of measured capacitances of column electrodes of those sections.

In some implementations, the row-specific noise capacitance for each column electrode of a section may be estimated by taking an average of the measured capacitances of the column electrodes of the section while the row electrode is being driven. FIG. 5 shows an example visual representation 500 of such an estimation approach. The visual representation 500 includes a measured capacitance signal 502 that is measured for each column electrode of a matrix while a particular row is being driven with an excitation voltage. The matrix is divided into a plurality of sections 504 of column electrodes (e.g., 5 sections—504A, 504B, 504C, 504D, 504E). For each section 504, the noise capacitance of each column electrode is estimated by taking a localized average 506 (e.g., 5 separate averages—506A, 506B, 506C, 506D, 506E) of the measured capacitances of each of the column electrodes in the section. The localized averages 506 may fit the portions of the measured capacitance signal 502 within the different sections 504 more accurately than a total average 508. The total average 508 may be calculated by taking an average of the measured capacitance signal 502 across the entire matrix. By using the localized averages 506 instead of the total average 508, false detections of touch input may be reduced. For example, using the total average 508 would cause false detections of touch input on the left edge since the signal for touch detection after mitigation using the total average 508 would still be bigger than the actual touch input.

Figure 6:
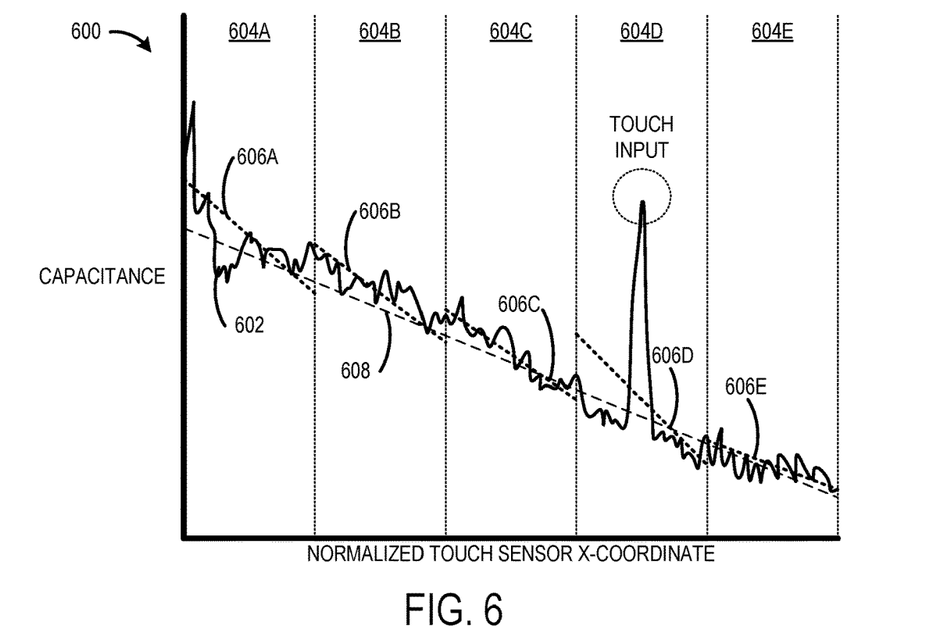
FIG. 6 shows an example visual representation of estimating noise capacitances localized to particular sections of a touch sensor matrix by applying linear regression to measured capacitances of column electrodes of those sections.

In some implementations, the row-specific noise capacitance for each column electrode of a section may be estimated by applying linear regression to the measured capacitances of the column electrodes of the section while the row electrode is being driven. FIG. 6 shows an example visual representation 600 of such an estimation approach. The visual representation 600 includes a measured capacitance signal 602 that is measured for each column electrode of a matrix while a particular row is being driven with an excitation voltage. The matrix is divided into a plurality of sections 604 of column electrodes (e.g., 5 sections—604A, 604B, 604C, 604D, 604E). For each section 604, the noise capacitance of each column electrode is estimated by locally applying linear regression or fitting of local lines 606 (e.g., 5 separate local lines 606A, 606B, 606C, 606D, 606E) to the measured capacitances of each of the column electrodes in the section. The local lines 606 may fit the portions of the measured capacitance signal 602 within the different sections 604 more accurately than a line 608 that is fit to the entire measured capacitance signal across the entire matrix. By applying linear regression locally to the measured capacitances of each section, false detections of touch input may be reduced. For example, using the line 608 fit, via linear regression, to the entire measured capacitance signal 602 would cause false detections of touch input on the left edge since the signal for touch detection after mitigation using the line 608 would still be bigger than (or much closer to) the actual touch input.

In one example, the noise capacitance is estimated by applying linear regression as follows for each row i:

```
for l = [1:L]
    le: left edge of the lth section
    re: right edge of the lth section
    // linear regression y = ax + b
    y = s(i, le:re )
    x = [le:re]
    // in matrix form y' = H*[a, b]', where
    H[:,1] = x'
    H[:,2] = 1
    // estimate a & b
    [a,b]' = inv(H'*H)*H'*y'
    // touch detection signal after noise mitigation
    s_m(i, le:re ) = s(i, le:re ) - a*x - b
```

In some implementations, the row-specific noise capacitance for each column electrode of a section may be estimated by applying a second order polynomial to the measured capacitances of the column electrodes of the section while the row electrode is being driven.

The linear regression and second order polynomial approaches may provide increased estimation accuracy relative to the average approach. However, in some examples, the linear regression and second order polynomial approaches may be more resource-intensive relative to the averaging approach.

Returning to FIG. 4, at 410, the method 400 includes during the touch-sensing frame, for each row electrode of the matrix, and for each section of column electrodes of the matrix, determining a touch input based on a difference between the measured capacitance of the column electrode while the row electrode is being driven and the estimated row-specific noise capacitance of the column electrode.

By providing signal noise mitigation that is localized for each section, the signal noise mitigation may be tailored to accommodate for signal noise variances of each section. Accordingly, signal noise mitigation accuracy may be increased, and correspondingly touch input detection accuracy may be increased for a touch sensor. Moreover, such an approach in some settings balances goals associated with touch input detection accuracy and touch input sensitivity.

In some implementations, the touch sensor 208 may perform the method 400 on a frame-by-frame basis to increase touch input detection accuracy. Such an implementation may be particularly applicable to touch-sensitive display device configurations that employ a signal inversion scheme. For example, to protect an LCD cell, a signal inversion scheme may be employed in which a signal is biased in different directions for different frames (e.g., odd/even frame). In one example the average amplitude of the signal noise for an odd frame is −45, while the average amplitude for an even frame is 45. Because the noise capacitance is estimated every frame, large frame-to-frame variances in signal amplitude may be accounted for. In contrast, approaches that do not estimate noise capacitance every frame may cause false touch input detections in every other frame.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
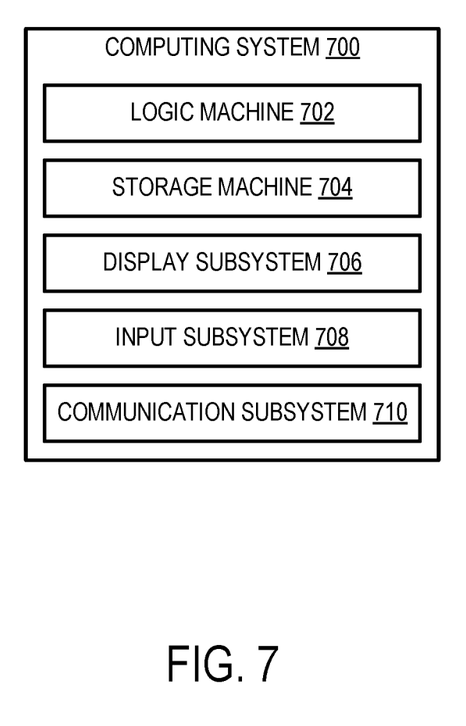
FIG. 7 shows an example computing system.

FIG. 7 schematically shows a non-limiting implementation of a computing system 700 that can enact one or more of the methods and processes described above. Computing system 700 is shown in simplified form. Computing system 700 may take the form of one or more display devices, active styluses, personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 702 may include one or more processors configured to execute software instructions. Additionally or alternatively, Logic machine 702 may include one or more hardware or firmware logic machines configured to execute hardware or firmware instructions. Processors of logic machine 702 may be single-core or multi-core, and the instructions executed thereon may be configured for sequential, parallel, and/or distributed processing. Individual components of logic machine 702 optionally may be distributed among two or more separate devices, which may be remotely located and/or configured for coordinated processing. Aspects of logic machine 702 may be virtualized and executed by remotely accessible, networked computing devices configured in a cloud-computing configuration.

Storage machine 704 includes one or more physical devices configured to hold instructions executable by logic machine 702 to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc), semiconductor memory (e.g., RAM, EPROM, EEPROM), and/or magnetic memory (e.g., hard-disk drive, floppy-disk drive, tape drive, MRAM), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by storage machine 704, and thus transform the state of storage machine 704, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, communication subsystem 710 may be configured for communication via a wireless telephone network, or a wired or wireless local- or wide-area network. In some embodiments, communication subsystem 710 may allow computing system 700 to send and/or receive messages to and/or from other devices via a network such as the Internet.

Additional aspects of the present disclosure are described below. According to one aspect, a touch-sensitive display device comprises a touch sensor having a matrix of row electrodes and column electrodes, drive circuitry configured to drive the row electrodes during a touch-sensing frame to influence electrical conditions on the column electrodes, and receive circuitry. The receive circuitry is configured to during the touch-sensing frame, for each row electrode of the matrix, 1) measure a capacitance of each column electrode while the row electrode is being driven, 2) for each of a plurality of different sections of column electrodes of the matrix, perform local analysis of the measured capacitances of the column electrodes of the section to estimate a row-specific noise capacitance for each column electrode, and 3) determine a touch input based on a difference between the measured capacitance of the column electrode while the row electrode is being driven and the estimated row-specific noise capacitance of the column electrode. In this aspect, the receive circuitry may be configured to estimate the row-specific noise capacitance for each column electrode of a section by taking an average of the measured capacitances of the column electrodes of the section while the row electrode is being driven. In this aspect, the receive circuitry may be configured to estimate the row-specific noise capacitance for each column electrode of a section by applying linear regression to the measured capacitances of the column electrodes of the section while the row electrode is being driven. In this aspect, the receive circuitry may be configured to estimate the row-specific noise capacitance for each column electrode of a section by applying a second order polynomial to the measured capacitances of the column electrodes of the section while the row electrode is being driven. In this aspect, the receive circuitry may be configured to divide the column electrodes of the matrix into a number of sections based on one or more characteristics of the column electrodes of the matrix. In this aspect, the receive circuitry may be configured to divide the column electrodes of the matrix into a number of sections based on time-varying noise characteristics of the touch-sensitive display device. In this aspect, the receive circuitry may be configured to divide the column electrodes of the matrix into a plurality of sections at least once per a threshold number of touch-sensing frames. In this aspect, the receive circuitry may be configured to divide the column electrodes of the matrix into a plurality of sections at least once during the touch-sensing frame. In this aspect, the receive circuitry may be configured to divide the column electrodes of the matrix into a plurality of sections more than once during the touch-sensing frame.

According to another aspect, a method for controlling a touch-sensitive display device including a touch sensor having a matrix of row electrodes and column electrodes comprises driving the row electrodes during a touch-sensing frame to influence electrical conditions on the column electrodes, during the touch-sensing frame, for each row electrode of the matrix, measuring a capacitance of each column electrode while the row electrode is being driven, for each of a plurality of different sections of column electrodes of the matrix, performing local analysis of the measured capacitances of the column electrodes of the section to estimate a row-specific noise capacitance for each column electrode, and determining a touch input based on a difference between the measured capacitance of the column electrode while the row electrode is being driven and the estimated row-specific noise capacitance of the column electrode. In this aspect, the row-specific noise capacitance for each column electrode of a section may be estimated by taking an average of the measured capacitances of the column electrodes of the section while the row electrode is being driven. In this aspect, the row-specific noise capacitance for each column electrode of a section may be estimated by applying linear regression to the measured capacitances of the column electrodes of the section while the row electrode is being driven. In this aspect, the row-specific noise capacitance for each column electrode of a section may be estimated by applying a second order polynomial to the measured capacitances of the column electrodes of the section while the row electrode is being driven. In this aspect, the column electrodes of the matrix may be divided into a number of sections based on time-varying noise characteristics of the touch-sensitive display device. In this aspect, the column electrodes of the matrix may be divided into a number of sections based on one or more characteristics of the column electrodes of the matrix. In this aspect, the column electrodes of the matrix may be divided into a plurality of sections at least once during the touch-sensing frame.

According to another aspect, a touch-sensitive display device comprises a touch sensor having a matrix of row electrodes and column electrodes, drive circuitry configured to drive the row electrodes during a touch-sensing frame to influence electrical conditions on the column electrodes, and receive circuitry. The receive circuitry is configured to during the touch-sensing frame, for each row electrode of the matrix, 1) measure a capacitance of each column electrode while the row electrode is being driven, 2) divide the matrix into a plurality of different sections of column electrodes based on the measured capacitances of each column electrode while the row electrode is being driven, 3) for each of a plurality of different sections of column electrodes of the matrix, perform local analysis of the measured capacitances of the column electrodes of the section to estimate a row-specific noise capacitance for each column electrode, and 4) determine a touch input based on a difference between the measured capacitance of the column electrode while the row electrode is being driven and the estimated row-specific noise capacitance of the column electrode. In this aspect, the receive circuitry may be configured to estimate the row-specific noise capacitance for each column electrode of a section by taking an average of the measured capacitances of the column electrodes of the section while the row electrode is being driven. In this aspect, the receive circuitry may be configured to estimate the row-specific noise capacitance for each column electrode of a section by applying linear regression to the measured capacitances of the column electrodes of the section while the row electrode is being driven. In this aspect, the receive circuitry may be configured to estimate the row-specific noise capacitance for each column electrode of a section by applying a second order polynomial to the measured capacitances of the column electrodes of the section while the row electrode is being driven.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A touch-sensitive display device, comprising:
  a touch sensor having a matrix of row electrodes and column electrodes;
  drive circuitry configured to drive the row electrodes during a touch-sensing frame to influence electrical conditions on the column electrodes; and
  receive circuitry configured to:
    during the touch-sensing frame, for each row electrode of the matrix:

1) measure a capacitance of each column electrode while the row electrode is being driven,
2) for each of a plurality of different sections of column electrodes on different portions of the matrix, perform a section-specific local analysis of the measured capacitances of the column electrodes of the section to estimate a row-specific noise capacitance for each column electrode of the section, said row-specific noise capacitance being specific to the column electrodes of the section on that portion of the matrix, and estimated independently of row-specific noise capacitances for column electrodes in other sections of the matrix such that row-specific noise capacitances estimated for different sections differ across different portions of the matrix, and
3) determine a touch input based on a difference between the measured capacitance of the column electrode while the row electrode is being driven and the estimated row-specific noise capacitance of the section that includes the column electrode.

2. The touch-sensitive display device of claim 1, where the receive circuitry is configured to estimate the row-specific noise capacitance for each column electrode of a section by taking an average of the measured capacitances of the column electrodes of the section while the row electrode is being driven.

3. The touch-sensitive display device of claim 1, where the receive circuitry is configured to estimate the row-specific noise capacitance for each column electrode of a section by applying linear regression to the measured capacitances of the column electrodes of the section while the row electrode is being driven.

4. The touch-sensitive display device of claim 1, where the receive circuitry is configured to estimate the row-specific noise capacitance for each column electrode of a section by applying a second order polynomial to the measured capacitances of the column electrodes of the section while the row electrode is being driven.

5. The touch-sensitive display device of claim 1, where the receive circuitry is configured to divide the column electrodes of the matrix into a number of sections based on one or more characteristics of the column electrodes of the matrix.

6. The touch-sensitive display device of claim 1, where the receive circuitry is configured to divide the column electrodes of the matrix into a number of sections based on time-varying noise characteristics of the touch-sensitive display device.

7. The touch-sensitive display device of claim 6, where the receive circuitry is configured to divide the column electrodes of the matrix into a plurality of sections at least once per a threshold number of touch-sensing frames.

8. The touch-sensitive display device of claim 6, where the receive circuitry is configured to divide the column electrodes of the matrix into a plurality of sections at least once during the touch-sensing frame.

9. The touch-sensitive display device of claim 6, where the receive circuitry is configured to divide the column electrodes of the matrix into a plurality of sections more than once during the touch-sensing frame.

10. A method for controlling a touch-sensitive display device including a touch sensor having a matrix of row electrodes and column electrodes, the method comprising:
driving the row electrodes during a touch-sensing frame to influence electrical conditions on the column electrodes;
during the touch-sensing frame, for each row electrode of the matrix,
measuring a capacitance of each column electrode while the row electrode is being driven;
for each of a plurality of different sections of column electrodes on different portions of the matrix, performing a section-specific local analysis of the measured capacitances of the column electrodes of the section to estimate a row-specific noise capacitance for each column electrode of the section, said row-specific noise capacitance being specific to the column electrodes of the section on that portion of the matrix, and estimated independently of row-specific noise capacitances for column electrodes in other sections of the matrix such that row-specific noise capacitances estimated for different sections differ across different portions of the matrix; and
determining a touch input based on a difference between the measured capacitance of the column electrode while the row electrode is being driven and the estimated row-specific noise capacitance of the section that includes the column electrode.

11. The method of claim 10, where the row-specific noise capacitance for each column electrode of a section is estimated by taking an average of the measured capacitances of the column electrodes of the section while the row electrode is being driven.

12. The method of claim 10, where the row-specific noise capacitance for each column electrode of a section is estimated by applying linear regression to the measured capacitances of the column electrodes of the section while the row electrode is being driven.

13. The method of claim 10, where the row-specific noise capacitance for each column electrode of a section is estimated by applying a second order polynomial to the measured capacitances of the column electrodes of the section while the row electrode is being driven.

14. The method of claim 10, where the column electrodes of the matrix are divided into a number of sections based on time-varying noise characteristics of the touch-sensitive display device.

15. The method of claim 10, where the column electrodes of the matrix are divided into a number of sections based on one or more characteristics of the column electrodes of the matrix.

16. The method of claim 10, where the column electrodes of the matrix are divided into a plurality of sections at least once during the touch-sensing frame.

17. A touch-sensitive display device, comprising:
a touch sensor having a matrix of row electrodes and column electrodes;
drive circuitry configured to drive the row electrodes during a touch-sensing frame to influence electrical conditions on the column electrodes; and
receive circuitry configured to:
during the touch-sensing frame, for each row electrode of the matrix:
1) measure a capacitance of each column electrode while the row electrode is being driven,
2) divide the matrix into a plurality of different sections of column electrodes on different portions of the matrix based on the measured capacitances of each column electrode while the row electrode is being driven,
3) for each of the plurality of different sections of column electrodes of the matrix, perform a section-specific local analysis of the measured capacitances of the column electrodes of the section to estimate a row-specific noise capacitance for each column electrode of the section, said row-specific noise capacitance being specific to the column electrodes of the section on that portion of the matrix, and estimated independently of row-specific noise capacitances for column electrodes in other sections of the matrix such that row-specific noise capacitances estimated for different sections differ across different portions of the matrix, and 4) determine a touch input based on a difference between the measured capacitance of the column electrode while the row electrode is being driven and the estimated row-specific noise capacitance of the section that includes the column electrode.

18. The touch-sensitive display device of claim 17, where the receive circuitry is configured to estimate the row-specific noise capacitance for each column electrode of a section by taking an average of the measured capacitances of the column electrodes of the section while the row electrode is being driven.

19. The touch-sensitive display device of claim 17, where the receive circuitry is configured to estimate the row-specific noise capacitance for each column electrode of a section by applying linear regression to the measured capacitances of the column electrodes of the section while the row electrode is being driven.

20. The touch-sensitive display device of claim 17, where the receive circuitry is configured to estimate the row-specific noise capacitance for each column electrode of a section by applying a second order polynomial to the measured capacitances of the column electrodes of the section while the row electrode is being driven.

* * * * *